United States Patent
Goodman et al.

(10) Patent No.: US 8,718,628 B2
(45) Date of Patent: May 6, 2014

(54) INTELLIGENT CALL IDENTIFICATION

(75) Inventors: Lee N. Goodman, Tyngsboro, MA (US);
Elliot G. Eichen, Arlington, MA (US);
Punita Mishra, Potomac, MD (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 99 days.

(21) Appl. No.: 13/279,483

(22) Filed: Oct. 24, 2011

(65) Prior Publication Data

US 2013/0102298 A1    Apr. 25, 2013

(51) Int. Cl.
*H04M 3/42*    (2006.01)

(52) U.S. Cl.
USPC ..................................... 455/417; 379/211.02

(58) Field of Classification Search
USPC ..................................... 455/417; 379/211.02
See application file for complete search history.

(56) References Cited

U.S. PATENT DOCUMENTS

| | | | | |
|---|---|---|---|---|
| 4,723,273 | A * | 2/1988 | Diesel et al. | 379/211.02 |
| 4,893,336 | A * | 1/1990 | Wuthnow | 379/211.02 |
| 5,615,253 | A * | 3/1997 | Kocan et al. | 379/196 |
| 6,125,126 | A * | 9/2000 | Hallenst.ang.l | 370/522 |
| 6,154,645 | A * | 11/2000 | Ahlstrom et al. | 455/414.1 |
| 7,095,838 | B1 * | 8/2006 | Kanerva et al. | 379/211.02 |
| 7,127,240 | B2 * | 10/2006 | Benco et al. | 455/417 |
| 7,177,631 | B2 * | 2/2007 | Amin | 455/415 |
| 7,664,491 | B2 * | 2/2010 | Vander Veen | 455/417 |
| 2004/0229600 | A1 * | 11/2004 | Saez et al. | 455/417 |
| 2006/0166658 | A1 * | 7/2006 | Bennett et al. | 455/416 |
| 2006/0205393 | A1 * | 9/2006 | Veen | 455/417 |
| 2006/0223511 | A1 * | 10/2006 | Hagale et al. | 455/417 |
| 2008/0051066 | A1 * | 2/2008 | Bandhole et al. | 455/413 |
| 2009/0305683 | A1 * | 12/2009 | Gupta et al. | 455/417 |
| 2012/0052851 | A1 * | 3/2012 | Davis et al. | 455/417 |
| 2012/0295602 | A1 * | 11/2012 | Einbinder et al. | 455/417 |

* cited by examiner

*Primary Examiner* — Charles Shedrick

(57) ABSTRACT

A network device receives, from a switching node, a forwarded call directed to a particular mobile terminal and holds the forwarded call. The network device generates an alert message including context information for the forwarded call and sends, to the mobile terminal, the alert message. Information from the alert message is presented to a user of the mobile terminal in advance of receiving the call. After sending the alert message, the network device routes the forwarded call to the mobile terminal.

20 Claims, 8 Drawing Sheets

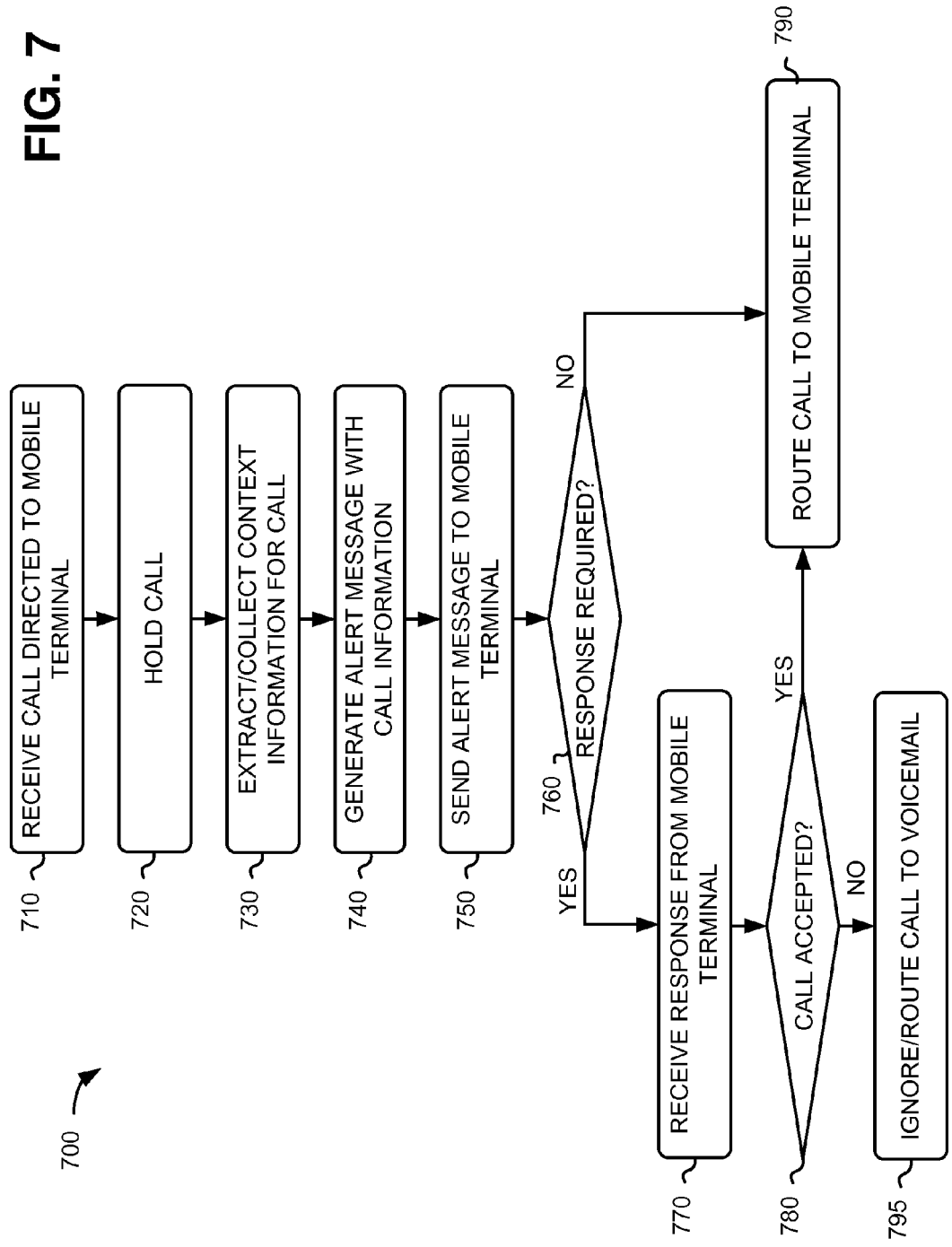

INTELLIGENT CALL IDENTIFICATION

BACKGROUND

Call forwarding (also known as call diverting) is a feature available on some telephone networks that allows an incoming call to a particular dialed number (e.g., associated with a particular device) to be redirected to a mobile telephone or another telephone number (e.g., where the called party is actually located). Call forwarding may be an integral feature of some phone systems that provide an integrated docking station (e.g., for a smartphone) with a fixed telephone device. For example, when a user removes a mobile phone from a docking station associated with a fixed office phone, calls to both the mobile and office phones may automatically be routed to the mobile phone.

BRIEF DESCRIPTION OF THE DRAWINGS

FIG. 7 is a flow chart of an exemplary process for providing intelligent call identification for call forwarding according to implementations described herein.

DETAILED DESCRIPTION OF PREFERRED EMBODIMENTS

The following detailed description refers to the accompanying drawings. The same reference numbers in different drawings may identify the same or similar elements.

In conventional call-forwarding systems, recipients of forwarded calls may not be provided with sufficient information to properly respond to a call. In most instances, the call recipient may not be made aware of the actual voice service used by the calling party. Additionally, in some instances, caller identification (ID) information may not be preserved. A call recipient may want to handle forwarded calls differently, depending on the voice service from a forwarded call originated. For example, if both an employee's work desk phone and home phone are call-forwarded to the employee's mobile phone, the employee may always want to answer a call forwarded from the work desk phone, but might want to ignore personal calls from a home phone.

Systems and/or methods described herein may intelligently forward calls to a mobile device, presenting, to the end user of the mobile device, origin and context information for the forwarded call. In one implementation, a network device may receive, from a switching node, a forwarded call that is directed to a particular mobile terminal. The network device may generate an alert message that includes context information for the forwarded call, and may send, to the mobile terminal, the alert message via a first network (e.g., a data network). After sending the alert message, the network device may route the forwarded call to the mobile terminal via a second network (e.g., a voice network) if other instructions from the mobile terminal are not received within a particular period. The alert message may enable a user of the mobile terminal to identify information about the incoming call that may affect how the user decides to answer (or otherwise manage) the forwarded call.

Figure 1:
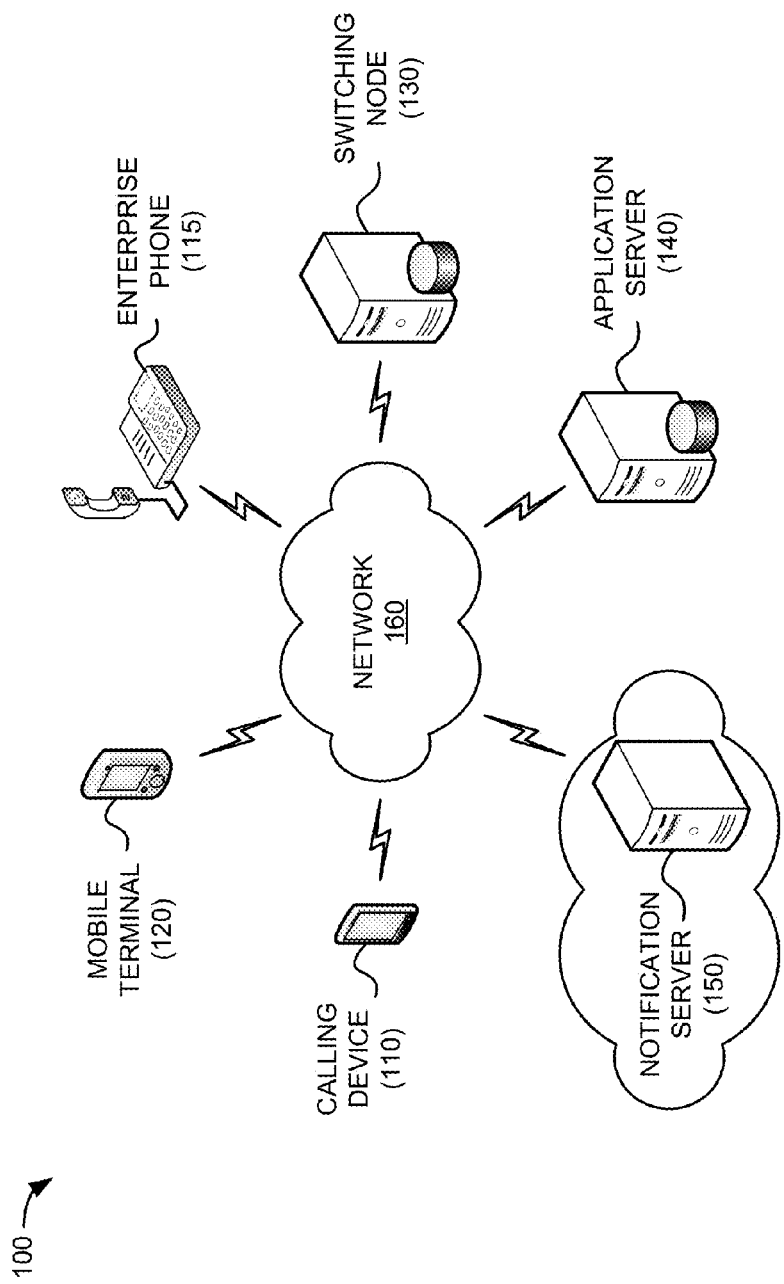
FIG. 1 is a diagram of a network in which systems and/or methods described herein may be implemented.

FIG. 1 is a diagram of a network 100 in which systems and/or methods described herein may be implemented. As illustrated, network 100 may include a calling device 110, an enterprise phone 115, a mobile terminal 120, a switching node 130, an application server 140, and a notification server 150 interconnected by a network 160. Components of network 100 may interconnect via wired and/or wireless connections. A single calling device 110, enterprise phone 115, mobile terminal 120, switching node 130, application server 140, notification server 150, and network 160 have been illustrated in FIG. 1 for simplicity. In practice, there may be more or fewer components of network 100. Also, in some instances, one or more of the components of network 100 may perform one or more functions described as being performed by another one or more of the components of network 100.

Calling device 110 may include a radiotelephone, a landline telephone, a voice over Internet Protocol (VoIP) device, a wireless telephone, a cellular telephone, a smartphone, a tablet computer, a laptop computer, a personal computer, a media playing device, a portable gaming device, or other types of computation or communication devices. In one implementation, calling device 110 may include any device that is capable of initiating a call to enterprise phone 115.

Enterprise phone 115 may include a telephone or another type of computation or communication device that receives calls via switching node 130. For example, enterprise phone 115 may include a landline telephone, a VoIP device, or another device associated with a particular telephone number.

Mobile terminal 120 may include a telephone or another type of computation or communication device that is capable of receiving a forwarded call and displaying information about a call. For example, mobile terminal 120 may store and execute an application to receive and display information about impending in bound calls. In one implementation, mobile terminal 120 may include a mobile device to which calls to enterprise phone 115 may be forwarded. Although described herein in the context of a mobile device, in other implementations, mobile terminal 120 may include a wired or wireless device. For example, mobile terminal 120 may include a landline telephone, a VoIP device, a cellular telephone, a smartphone, a tablet computer, a laptop computer, a personal computer, etc.

Switching node 130 may include telephone exchange, such as a private branch exchange (PBX), a central exchange (Centrex), or a soft switch, that services enterprise phone 115 and implements call-forwarding services. In one implementation, switching node 130 may be associated with a different service provider than the service provider for mobile terminal 120 and/or application server 140.

Application server 140 may include one or more server devices, network devices, or other types of computation or communication devices, that gather, process, search, and/or provide information in a manner described herein. Application server 140 may receive forwarded calls from switching node 130, may temporarily hold the forwarded call, may redirect calls, and/or may forward calls to mobile terminal 120. Application server 140 may also generate and send separate alert messages, associated with the forwarded calls, to mobile terminal 120. Each of the alert messages may include origination and/or context information associated with a forwarded call. In one implementation, application server 140 may route forwarded calls via a dedicated voice network within network 160 and may send the alert message via a separate data network within network 160.

In one implementation, application server 140 may provide (e.g. to mobile device 120) a context notification application that receives alert messages and presents alert messages to a user. Application server 140 may provide the context notification application for a particular hardware and/or software environment. For example, application server 140 may provide different versions of the context notification application that are particularly configured for proprietary operating systems running on mobile device 120 or other devices. In one implementation, the context notification application may include a user interface to enable a user to make choices regarding handling of an inbound call and respond to application server 140. In other implementations, the context notification application may be provided to mobile device 120 from a source other than application server 140.

Notification server 150 may include one or more server devices, network devices, or other types of computation or communication devices, that gather, process, search, and/or provide information in a manner described herein. In one implementation, notification server 150 may receive messages from application server 140 and may provide the messages to mobile terminal 120. For example, notification server 150 may receive an alert message for a pending forwarded call and may automatically provide the alert message to the particular mobile terminal 120. According to an implementation, notification server 150 may be included in a cloud network or a packet-switched network that provides a cloud service or a web service. For example, notification server 150 may be included within a cloud-based service to take advantage of an established cloud-computing connectivity infrastructure.

Network 160 may include one or more networks, such as a wireless network, a satellite network, the Internet, a telephone network (such as the Public Switched Telephone Network (PSTN)), a metropolitan area network (MAN), a wide area network (WAN), a local area network (LAN), a mesh network, or another type of network. In an one implementation, network 160 may include a combination of networks and other components (e.g., switches, routers, etc.) for transmitting data to and from calling device 110, enterprise phone 115, mobile terminal 120, switching node 130, application server 140, notification server 150, and/or other devices (not shown).

In operation, application server 140 may receive a forwarded call from switching node 130 and may hold the forwarded call temporarily while application server 140 extracts and/or collects context information (e.g., caller ID, number dialed, service used, caller presence information, caller avatars, etc.) for the call. Application server 140 may send an alert message that includes at least some of the extracted/collected context information to mobile terminal 120 via notification server 150. Information from the alert message may be presented to a user of mobile terminal in advance of (or in conjunction with) receiving the forwarded call. In one implementation, application server 140 may hold the forwarded call until a response is received from mobile terminal 120. In another implementation, application server 140 may hold the forwarded call for a pre-determined duration. After a response is received from mobile terminal 120, or after the pre-determined duration has expired, application server 140 may forward the call to the wireless telephone number associated with mobile terminal 120.

Although FIG. 1 shows example components of network 100, in other implementations, network 100 may include fewer components, different components, differently arranged components, and/or additional components than those depicted in FIG. 1. For example, in one implementation, network 100 may include additional servers from which application server 140 may retrieve additional information, such as presence information, to supplement context information in the alert messages provided to mobile terminal 120.

Figure 2:
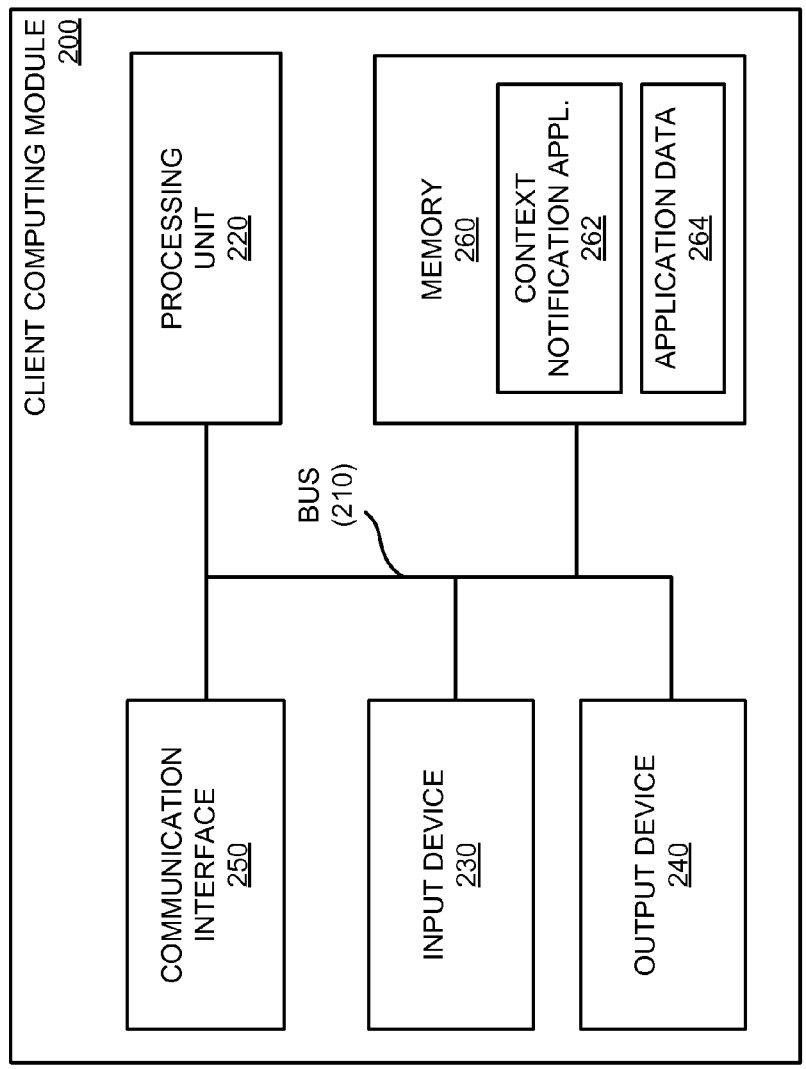
FIG. 2 is a diagram of illustrative components of a mobile terminal of FIG. 1.

FIG. 2 is a block diagram of exemplary components of a client computing module 200 that may correspond to mobile terminal 120. Client computing module 200 may also correspond to calling device 110. Client computing module 200 may include a bus 210, processing logic 220, an input device 230, an output device 240, a communication interface 250, and a memory 260. Client computing module 200 may include other components (not shown) that aid in receiving, transmitting, and/or processing data. Moreover, other configurations of components in client computing module 200 are possible.

Bus 210 may include a path that permits communication among the components of client computing module 200. Processing unit 220 may include any type of processor or microprocessor (or groups of processors or microprocessors) that interprets and executes instructions. In other embodiments, processing unit 220 may include an application-specific integrated circuit (ASIC), a field-programmable gate array (FPGA), or the like.

Input device 230 may include a device that permits a user to input information into client computing module 200, such as a keyboard, a mouse, a pen, a remote control, a touch-screen display, etc. Output device 240 may include a device that outputs information to the user, such as a display, a speaker, etc. Output device 240 may also include a vibrator to alert a user.

Input device 230 and output device 240 may allow the user to activate a particular service or application, such as a context notification application and/or service. Input device 230 and output device 240 may allow the user to receive and view a menu of options and select from the menu options. The menu may allow the user to select various functions or services associated with applications executed by client computing module 200.

Communication interface 250 may enable client computing module 200 to communicate with other devices and/or systems. Communication interface 250 may include a transmitter that may convert baseband signals to radio frequency (RF) signals and/or a receiver that may convert RF signals to baseband signals. Alternatively, communication interface 250 may include a transceiver to perform functions of both a transmitter and a receiver. Communication interface 250 may be coupled to an antenna for transmission and reception of the RF signals. Communications interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface for communicating with Bluetooth devices, a near-field communication (NFC) interface, etc. Communication interface 250 may implement a wireless communication protocol, e.g., GSM, CDMA, WCDMA, GPRS, EDGE, etc. Communications interface 250 may also receive, transmit and/or process digital or analog audio inputs/outputs and/or digital or analog video inputs/outputs.

Memory 260 may include a random access memory (RAM) or another type of dynamic storage device that may store information and instructions, e.g., an application, for execution by processing logic 220; a read-only memory (ROM) device or another type of static storage device that may store static information and instructions for use by processing unit 220; and/or some other type of magnetic or optical recording medium and its corresponding drive, e.g., a hard disk drive (HDD), for storing information and/or instructions.

Memory 260 may include a context notification application 262 and application data 264. Context notification application 262 may listen for alert messages from notification server 150 (e.g., originating from application server 140), may receive the alert messages, may present context information (e.g., based on the alert messages) to a user of mobile terminal 120, and/or may associate the context information with a received inbound call. In one implementation, context notification application 262 may also include a user interface to enable a user to make choices regarding handling of an inbound call and send instructions (e.g., based on the user input) to application server 140. Application data 264 may include caller identification tables and/or data corresponding to queued items from context notification application 262.

As described herein, client computing module 200 may perform certain operations in response to processing unit 220 executing software instructions contained in a computer-readable medium, such as memory 260. A computer-readable medium may include a non-transitory memory device. A memory device may include space within a single physical memory device or spread across multiple physical memory devices. The software instructions may be read into memory 260 from another computer-readable medium or from another device via communication interface 250. The software instructions contained in memory 260 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Figure 3:
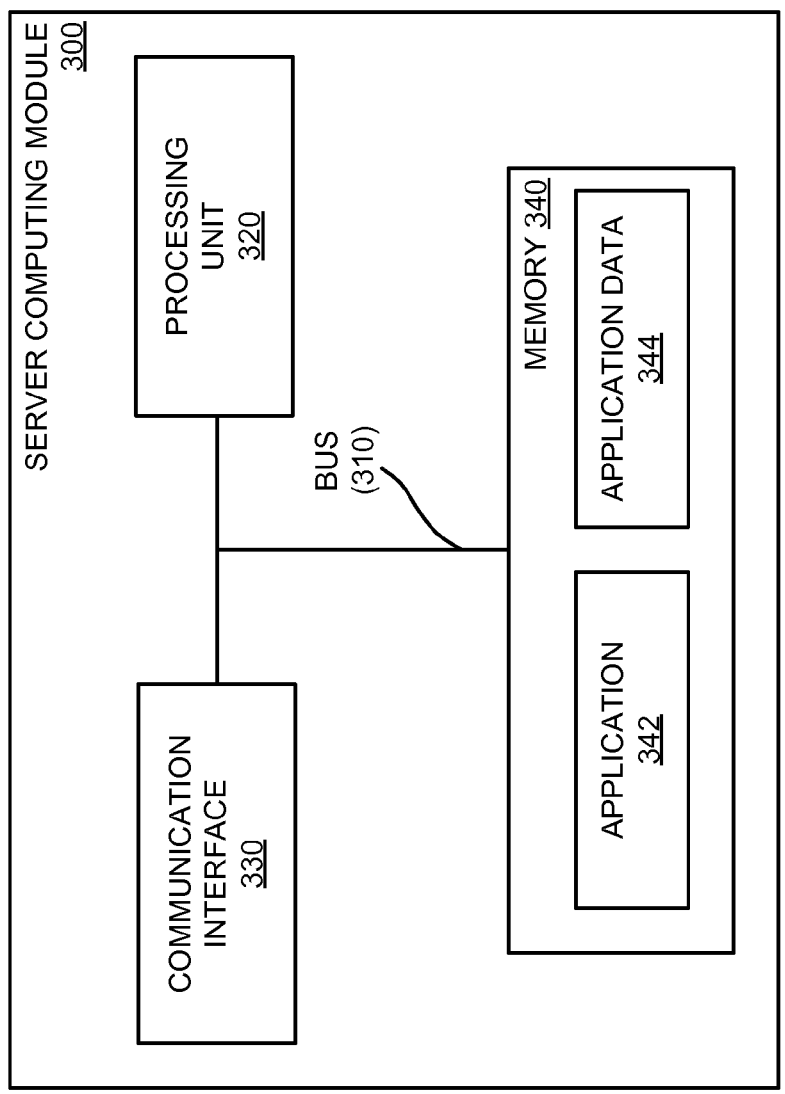
FIG. 3 is a diagram of illustrative components of one or more of the other devices of the network depicted in FIG. 1.

FIG. 3 is a block diagram of exemplary components of a server computing module 300 that may correspond to application server 140. Application server 140 may include one or more server computing modules (e.g., a rack of server computer modules), such as computing module 300. Server computing module 300 may include a bus 310, processing unit 320, a communication interface 330, and a memory 340. Server computing module 300 may include other components (not shown) that aid in receiving, transmitting, and/or processing data. Moreover, other configurations of components in module 300 are possible.

Bus 310 may include a path that permits communication among the components of module 300. Processing unit 320 may include any type of processor or microprocessor (or groups of processors or microprocessors) that interprets and executes instructions. In other embodiments, processing unit 320 may include an ASIC, an FPGA, or the like.

Communication interface 330 may enable module 300 to communicate with other devices and/or systems. For example, communication interface 300 may include mechanisms similar to those described above for communication interface 250 for communicating with other devices, such as other devices of network 100.

Memory 340 may include a RAM or another type of dynamic storage device that may store information and instructions, e.g., an application 342 and application data 344, for execution by processing unit 320; a ROM device or another type of static storage device that may store static information and instructions for use by processing unit 320; and/or some other type of magnetic or optical recording medium and its corresponding drive, e.g., a HDD, for storing information and/or instructions.

Application 342 may include an application to receive inbound calls (e.g., from switching node 130) and to associate the inbound call with call identification services for mobile terminal 120. Application 342 may temporarily hold the inbound call and play a recording for calling device 110. Application 342 may collect context information for the inbound call, may generate and/or send alert messages with the context information to mobile terminal 120 (via notification server 150), and may receive instructions from mobile terminal 120. After receiving instructions from mobile terminal 120, or after a particular delay period, application 432 may route (or forward) the inbound call to mobile terminal 120 (or to a voicemail server, depending on instructions from mobile terminal 120). Application data 344 may include tables and/or data corresponding to queued items from application 342.

Module 300 may perform certain operations, as described in detail below. Module 300 may perform these operations in response to processing unit 320 executing software instructions contained in a computer-readable medium, such as memory 340. The software instructions may be read into memory 340 from another computer-readable medium or from another device via communication interface 330. The software instructions contained in memory 340 may cause processing unit 320 to perform processes that are described below.

Figure 4:
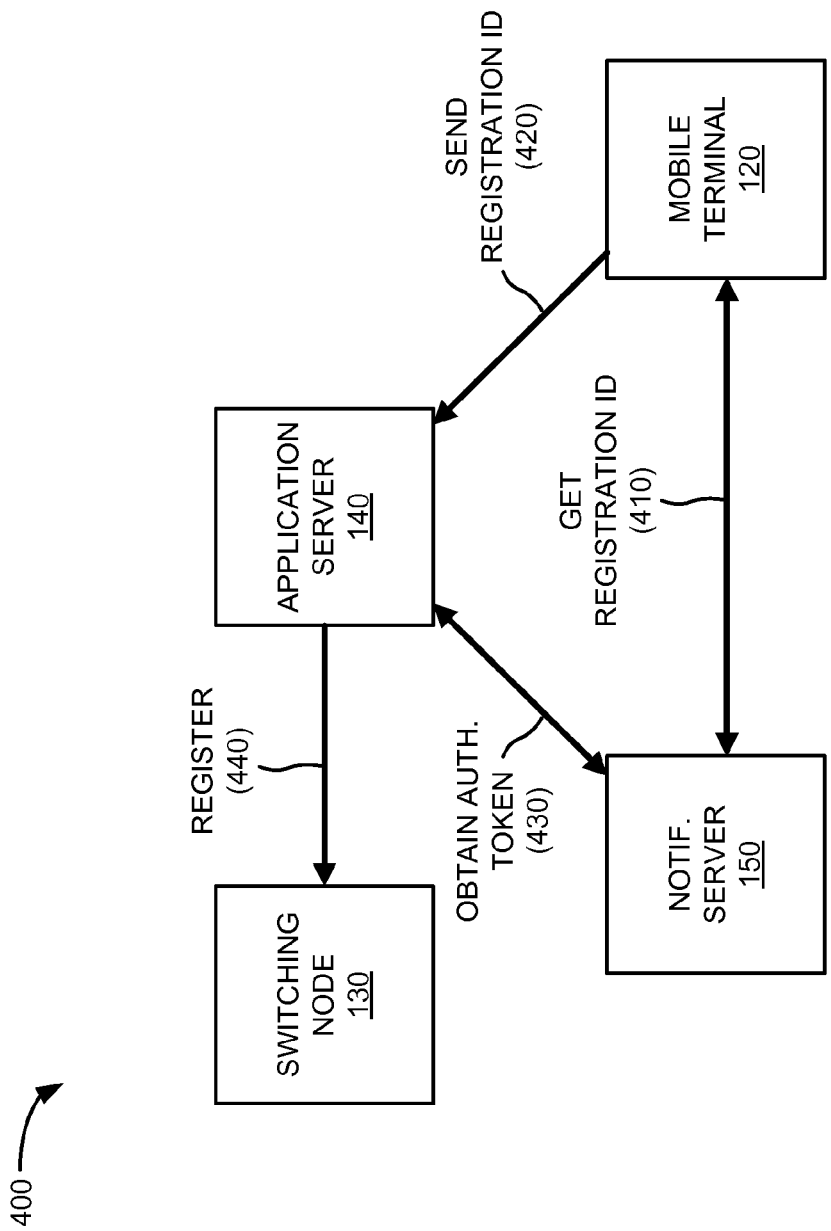
FIG. 4 is a diagram of illustrative communications within a portion of the network of FIG. 1.

FIG. 4 is a diagram of illustrative communications for a portion 400 of network 100. Communications in FIG. 4 may represent a setup procedure for configuring intelligent call identification. As shown in FIG. 4, network portion 400 may include mobile terminal 120, switching node 130, application server 140, and notification server 150. Mobile terminal 120, switching node 130, application server 140, and notification server 150 may include features described above in connection with, for example, FIGS. 1-3.

As shown in FIG. 4, mobile terminal 120 (e.g., context notification application 262) may register with notification server 150 to obtain a registration ID, as indicated by reference number 410. The registration ID may include a unique identification for context notification application 262 running on mobile terminal 120. The registration ID may be used by notification server 150 to provide information to mobile terminal 120 (e.g., to provide alert messages).

Mobile terminal 120 may provide, to application server 140, the unique registration ID (previously obtained from notification server 150) and a mobile identification number (MIN) associated with mobile terminal 120, as indicated by reference number 420.

Application server 140 may register with notification server 150 to obtain a security token, as indicated by reference number 430. For example, notification server 150 may provide a client authentication token that may be used when providing alert messages (e.g., for mobile terminal 120) to notification server 150.

In one implementation, application server 140 may register 440 with switching node 130 to establish a connection for forwarding inbound calls to switching node 130. For example, application server 140 may provide information to switching node 130 so that switching node 130 knows how to direct forwarded calls to application server 140. In other implementations, registration between switching node 130 and application server 140 may not be required.

Although FIG. 4 shows example components of network portion 400, in other implementations, network portion 400 may contain fewer components, different components, differently arranged components, or additional components than depicted in FIG. 4. Alternatively, or additionally, one or more components of network portion 400 may perform one or more other tasks described as being performed by one or more other components of network portion 400. For example, in another implementation, functions of application server 140 and notification server 150 may be combined in a single device or group of devices.

Figure 5:
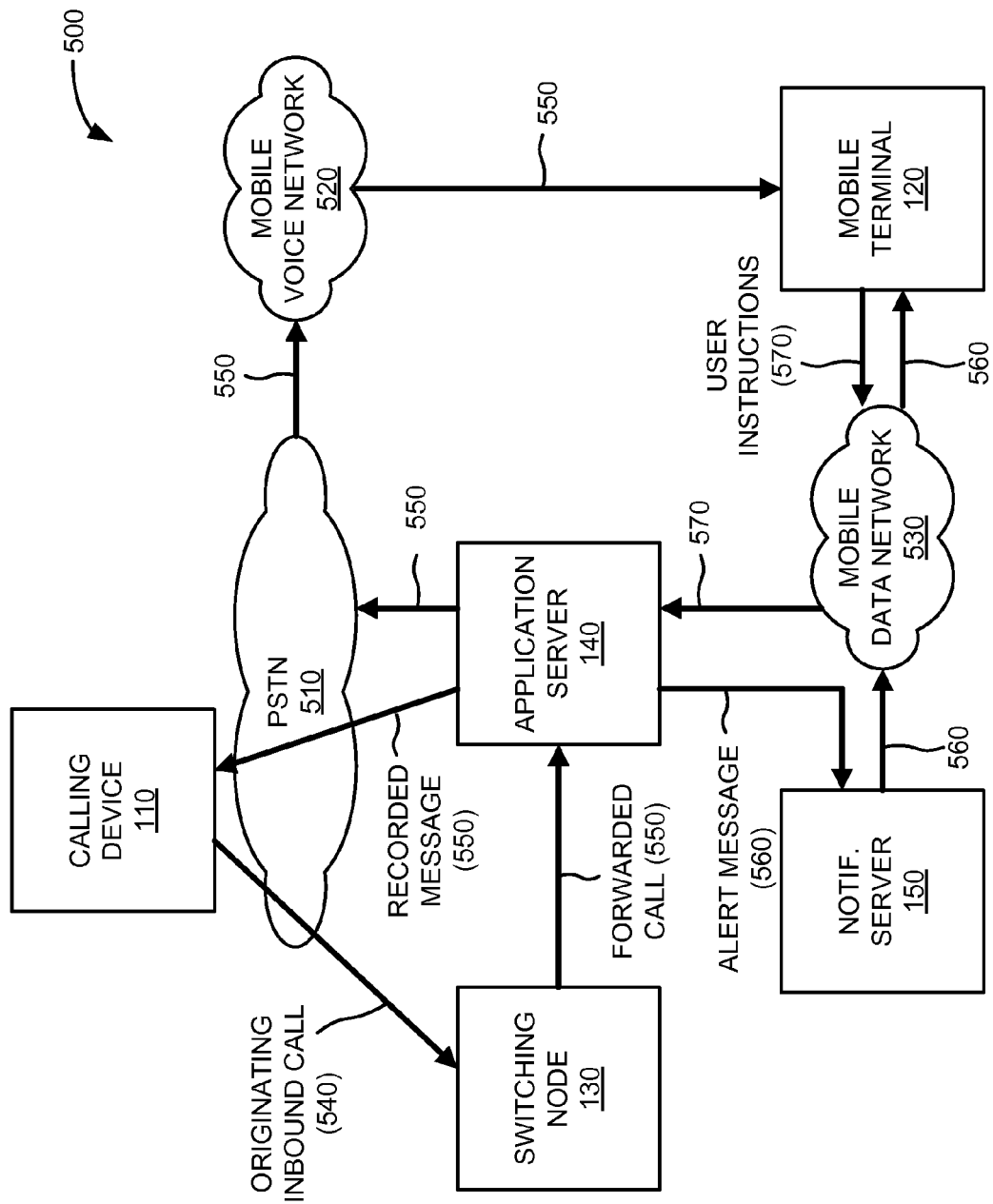
FIG. 5 is a diagram of further illustrative communications within another portion of the network of FIG. 1.

FIG. 5 is a diagram of illustrative communications for a portion 500 of network 100. Communications in FIG. 5 may represent intelligent call identification procedure. As shown in FIG. 5, network portion 500 may include mobile terminal 120, switching node 130, application server 150, notification server 150, PSTN 510, mobile voice network 520, and mobile data network 530. Mobile terminal 120, switching node 130, application server 150, and notification server 150 may include features described above in connection with, for example, FIGS. 1-4.

PSTN 510, mobile voice network 520, and mobile data network 530 may be part of network 160. Mobile voice network 520 may include elements that facilitate voice traffic and/or text messaging traffic to/from mobile terminal 120. Mobile data network 530 may include components that facilitate packet data traffic to/from mobile terminal 120. In one implementation, mobile voice network 520 and mobile data network 530 may include part of the same network, such as the same over-the-air interface to/from mobile terminal 120.

Referring to FIG. 5, switching node 130 may receive an originating inbound call 540 from calling device 110 via PSTN 510. Although PSTN 510 is used in the example of FIG. 5, any other network may be used to provide inbound call 540. Originating inbound call 540 may be directed to, for example, an enterprise number (e.g., an office telephone number) for enterprise phone 115 (not shown in FIG. 5). Switching node 130 may store call-forwarding instructions (e.g., provided by a user of enterprise phone 115 or provided automatically in conjunction with a smart phone docking station) for originating inbound call 540.

Based on the call-forwarding instructions, switching node 130 may send the call to application server 140 as forwarded call 550. In one implementation, forwarded call 550 may include caller ID information (e.g., a telephone number of calling device 110), called number information (e.g., a telephone number of enterprise phone 115), and a forwarding telephone number (e.g., an MIN for mobile terminal 120).

Based on forwarded call 550, application server 140 may generate an alert message 560 for mobile terminal 120. For example, application server 140 may extract context information, such as the caller ID, called number information, and/or the switching node information. Context information may, for example, be extracted from standard caller ID information (e.g., from PSTN network 410) or from advance caller ID techniques (e.g., address book matching). The extracted context information may be assembled in any of a variety of file formats that can be received and implemented by mobile terminal 120 (e.g., context notification application 262). In one implementation, alert message 560 may include a Short Message System (SMS) message. For example, the SMS message (e.g., alert message 560) may include a BREW (Binary Run Time Environment for Wireless) application message in an SMS message. In another implementation, alert message 560 may be a light notification. A "light" notification may include a notification that does not require significant bandwidth or significant data transfer, at least compared to a "heavy" notification or communication.

Application server 140 may send alert message 560 to notification sever 150 with the registration ID for mobile terminal 120 that was previously provided (e.g., reference number 420 of FIG. 4) to application server 140. In one implementation alert message 560 may be sent via a TCP connection over a public network connection, such as the Internet.

In one implementation, application server 140 may use information from forwarded call 550 to retrieve additional context information. For example, application server 140 may use the caller ID information to determine presence information, images (e.g., photos, avatars, etc.), or other data associated with the caller ID number. Presence information may be available internally to application server 140 for other users of the intelligent caller identification service (e.g., using network 100) or from other systems (not shown).

Notification server 150 may receive alert message 560 and may forward alert message 560 to mobile terminal 120. For example, notification server 150 may use the registration ID in alert message 560 and information from registration process 410 to direct alert message 560 to mobile terminal 120 and, particularly, context notification application 262. In one implementation, notification server 150 may send alert message 560 to mobile terminal 120 via a different network connection than is (or would be) used for later providing forwarded call 550 to mobile terminal 120. For example, notification server 150 may send alert message 560 to mobile terminal 120 via data network 530, while forwarded call 550 may be sent from application server 140 via mobile voice network 520.

Mobile terminal 120 may receive alert message 560 and, in response to alert message 560, may present an impending inbound call indication (e.g., a pop-up window, audible signal, and/or other indicator) to a user of mobile terminal 120. The impending inbound call indication may include, for example, some or all of the context information about forwarded call 550 that was included in alert message 560. For example, mobile terminal 120 may present the actual context information (e.g., a caller ID telephone number or dialed telephone number) included in alert message 560 or may present information derived from the alert message (e.g., contact names, images, nicknames, or other information associated with a telephone number). In one implementation, the impending call indication may include response options for the user of mobile terminal 120 to choose how to handle the impending inbound call. Examples of impending call indications generated by mobile terminal 120 are provided below in the connection with FIGS. 6A and 6B.

In one implementation, mobile terminal 120 may provide user instructions 570 to application server 140. For example, if mobile terminal 120 (e.g., running context notification application 262) presents response options to a user, and the user selects one of the options, mobile terminal 120 may provide an indication of the user's selection to application server 140 as user instructions 570. In one implementation, user instructions may be provided to application server 140 via mobile data network 530. Application server 140 may receive user instructions 570 and route forwarded call 550 based on user instructions 570. Application server 140 may route forwarded call 550 to, for example, mobile terminal 120 or a voicemail server (not shown).

To ensure alert message 560 is received by mobile terminal 120 prior to receiving forwarded call 550, application server 140 may hold forwarded call 550 temporarily while alert message 560 is being generated and sent to mobile terminal 120. In one implementation, application server 140 may hold forwarded call 550 for a pre-determined duration. In another implementation, application server 140 may hold forwarded call 550 until user instructions 570 are received from mobile terminal 120 or until a waiting period has expired. During the temporary holding period, application server 140 may play a recorded message 550 for calling device 110. The recorded message may include, for example, an indication that the system is attempting to locate the called party.

After a response is received from mobile terminal 120, or after the waiting period has expired, application server 140 may route forwarded call 550 to mobile terminal 120 (e.g., via PSTN 510 and/or mobile voice network 520). Mobile terminal 120 may announce forwarded call 550 to the user along with context information from alert message 560.

Although FIG. 5 shows example components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

Figure 6A:
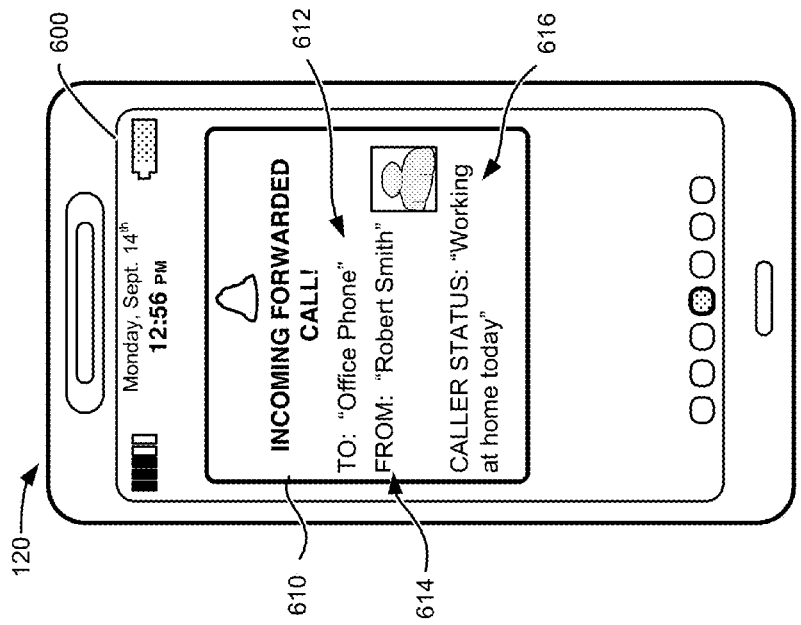
FIGS. 6A and 6B are diagrams of an illustrative user interface for application usage data that may be presented on a mobile terminal according to implementations described herein.
Figure 6B:
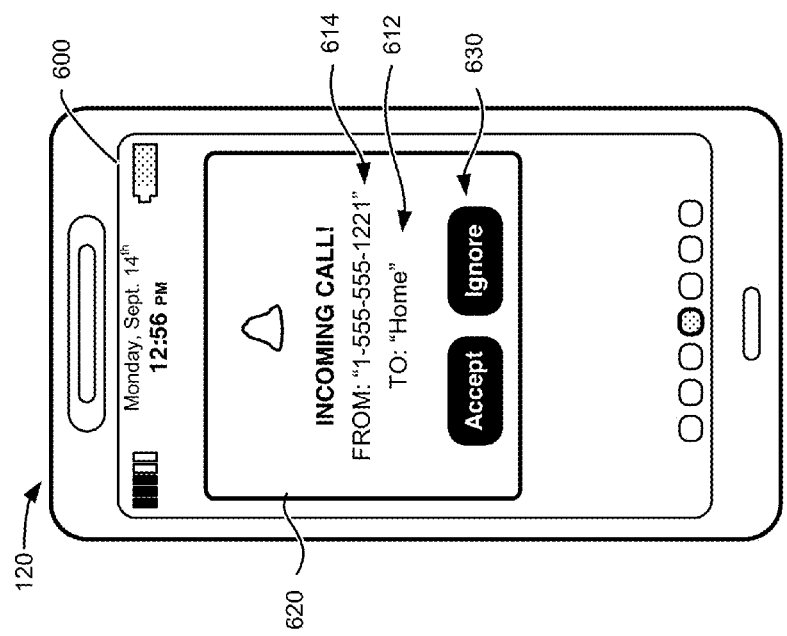

FIGS. 6A and 6B are diagrams of illustrative user interfaces of impending call indications that may be presented on mobile terminal 120 according to implementations described herein. FIG. 6A provides a view of mobile terminal 120, including a display screen 600, with an impending call indication 610 displayed. Impending call indication 610 may be generated, for example, by context notification application 262 described above. Impending call indication 610 may include an alert notice for an impending inbound call (e.g., "Incoming forwarded call!"). As shown in FIG. 6A, impending call indication 610 may also include context information for the impending inbound call including, for example, a number/location 612 dialed by the caller (e.g., "Office Phone"), a caller ID 614 (e.g., "Robert Smith"), and caller presence information 616 (e.g., "Working at home today"). Impending call indication 610 may be presented by mobile terminal 120, for example, a few seconds before or simultaneously with receipt of forwarded call 550.

FIG. 6B provides a view of another impending call indication 620, which may be presented on display screen 600 of customer terminal 120. Impending call indication 620 may be generated, for example, by context notification application 262 described above. Impending call indication 620 may include an alert notice for an impending inbound call (e.g., "Incoming call!"). As shown in FIG. 6B, impending call indication 620 may also include context information and response options 630 for the impending inbound call. For example, impending call indication 620 may include context information such as number/location 612 dialed by the caller (e.g., "Home") and caller ID 614 (e.g., "1-555-555-1221"). Response options 630 may include, for example, options for user input to accept (e.g., "Accept") or reject (e.g., "Ignore") the impending call (e.g., forwarded call 550). In another implementation, response options 630 may include options (not shown) to select among multiple voicemail systems, such a sending to a voicemail system for mobile terminal 120 or sending to a voicemail system associated with the number dialed by the caller (e.g., the number for enterprise phone 115 dialed by calling device 110). Impending call indication 610 may be presented by mobile terminal 120, for example, while forwarded call 550 remains on hold at application server 140. Selection, by a user, of one of response options 630 may cause mobile terminal 120 to send call routing instructions (e.g., user instructions 570) to application server 140.

Although FIGS. 6A and 6B show exemplary user interfaces associated with customer terminal 120, in other implementations, customer terminal 120 may present user interfaces with different or additional information than depicted in FIGS. 6A and 6B. Also, context notification application 262 may provide different formats for impending call indications 610/620 depending on the type of device used for mobile terminal 120.

FIG. 7 is a flow chart of a process 700 for providing intelligent call identification for call forwarding according to an implementation described herein. In one implementation, process 700 may be performed by application server 140. For example, process 700 may be performed by one or more processing units 320. In another implementation, some or all of process 700 may be performed by another device or group of devices, including or excluding application server 140.

As illustrated in FIG. 7, process 700 may include receiving a forwarded call directed to a mobile terminal (block 710) and holding the forwarded call (block 720). For example, in implementations described above in connection with FIG. 5, application server 140 may receive forwarded call 550 from switching node 130. Application server 140 may hold forwarded call 550 temporarily. In one implementation, application server 140 may hold forwarded call 550 for a predetermined duration. In another implementation, application server 140 may hold forwarded call 550 until user instructions 570 are received from mobile terminal 120 or until a waiting period has expired.

Returning to FIG. 7, process 700 may include extracting and/or collecting context information for the forwarded call (block 730), and generating an alert message with the call information (block 740). For example, in implementations described above in connection with FIG. 5, application server 140 may extract or collect context information for forwarded call 550. Application server 140 may generate alert message 560 from the extracted context information. The extracted context information may be assembled in any of a variety of file formats that can be received and implemented by mobile terminal 120 (e.g., context notification application 262).

As further shown in FIG. 7, process 700 may include sending the alert message to the mobile terminal (block 750). For example, in implementations described above in connection with FIG. 5, application server 140 may send alert message 560 to notification sever 150 with the registration ID for mobile terminal 120 that was previously provided (e.g., reference number 420 of FIG. 4) to application server 140. The alert message may be sent, for example, via mobile data network 530.

If a response is required to release the forwarded call (block 760—YES), process 700 may include receiving a response from the mobile terminal (block 770) and determining if the call is accepted (block 780). For example, in implementations described above in connection with FIG. 5, mobile terminal 120 may provide user instructions 570 to application server 140. For example, if mobile terminal 120 (e.g., running context notification application 262) presents response options to a user, and the user selects one of the options, mobile terminal 120 may provide an indication of the user's selection to application server 140 as user instructions 570. Application server 140 may receive user instructions 570.

If the call is accepted (block 780—YES) or if a response is not required to release the forwarded call (block 760—NO), process 700 may include routing the call to the mobile terminal (block 770). For example, in implementations described above in connection with FIG. 5, application server 120 may route forwarded call 550 based on user instructions 570. Application server 140 may route forwarded call 550 to, for example, mobile terminal 120 if instructions are not required or if instructions to accept the call are provided.

If the call is not accepted (block 780—NO), process 700 may include ignoring and/or routing the forwarded call to voicemail (block 795). For example, if user instructions 570 include instructions to ignore an impending call, application server may route forwarded call to a voicemail server or ignore the forwarded call from switching node 130.

Systems and/or methods described herein may provide intelligent call identification for call forwarding. The systems and/or methods may receive, from a switching node, a forwarded call directed to a particular mobile terminal and may hold the forwarded call. The systems and/or methods may generate an alert message including context information for the forwarded call and may send, to the mobile terminal, the alert message. Information from the alert message may be presented to a user of the mobile terminal in advance of or simultaneously with receiving the call. After sending the alert message, the systems and/or methods may route the forwarded call to the mobile terminal. The systems and/or methods may, thus, inform a customer (e.g., a user operating mobile terminal 120) of context information associated with in inbound forwarded call. The systems and/or methods may let the user know where the call came from, who is calling, and/or a caller photograph, presence status, etc.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
providing, by a network device and to a switching node, information to enable the switching node to direct calls that are forwarded from an enterprise phone number to the network device;
receiving, by the network device and via the switching node, a forwarded call directed to a particular mobile terminal;
holding, by the network device, the forwarded call;
generating, by the network device, an alert message including context information for the forwarded call;
sending, by the network device, the alert message to the mobile terminal via a first network; and
routing, by the network device and after sending the alert message, the forwarded call to the mobile terminal via a second network that is different than the first network.

2. The method of claim 1, further comprising:
receiving, from the mobile terminal, a user instruction for handling the forwarded call.

3. The method of claim 1, wherein generating the alert message includes extracting a caller identification and a called number for the forwarded call.

4. The method of claim 3, wherein generating the alert message further includes collecting presence information or images associated with a caller.

5. The method of claim 4, wherein collecting the presence information or images includes requesting information from another server.

6. The method of claim 1, wherein the mobile terminal includes a context notification application configured to receive the alert message and present information from the alert message to a user of the mobile terminal.

7. The method of claim 1, wherein sending the alert message includes providing the alert message to a notification server for distribution to the mobile terminal.

8. The method of claim 7, wherein the notification server is included in a cloud-computing infrastructure, and wherein the network device sends the alert message with a registration identification of the mobile terminal.

9. The method of claim 1, wherein the switching node is one of a private branch exchange (PBX), a central exchange (Centrex), or a soft switch associated with a first service provider, and wherein the network device is associated with a second service provider that is different than the first service provider.

10. The method of claim 1, wherein holding the forwarded call further comprises providing a recorded message to a calling device that originated the forwarded call.

11. A network device, comprising:
a memory to store a plurality of instructions; and
a processor configured to execute instructions in the memory to:
provide, to a switching node, information to enable the switching node to direct calls that are forwarded from an enterprise phone number to the network device;
receive, from the switching node, a forwarded call directed to a particular mobile terminal,
generate an alert message including context information for the forwarded call,
send, to the mobile terminal, the alert message, and
after sending the alert message, route the forwarded call to the mobile terminal if other instructions from the mobile terminal are not received within a particular period.

12. The network device of claim 11, wherein the processor is further configured to execute instructions in the memory to:

receive instructions from the mobile terminal, based on the alert message, to ignore the forwarded call, and route the forwarded call to a voicemail server based on the instructions from the mobile terminal.

13. The network device of claim 11, wherein the processor is further configured to execute instructions in the memory to:

hold the forwarded call for a particular time period before routing the forwarded call to the mobile terminal.

14. The network device of claim 11, wherein, when generating the alert message, the processor is further configured to execute instructions in the memory to:

extract a caller identification and a called number for the forwarded call.

15. The network device of claim 11, wherein, when sending the alert message, the processor is further configured to execute instructions in the memory to:

send the alert message, along with registration information for the mobile terminal, to a notification server for distribution to the mobile terminal.

16. A mobile terminal, comprising:

a memory to store a plurality of instructions and a context notification application running on the mobile terminal; and a processor configured to execute instructions in the memory to:

listen, over a first network, for an alert message from a notification device, receive, via the first network and from the notification device, the alert message, wherein the alert message includes a registration identification for the context notification application running on the mobile terminal and context information for an impending inbound call to the mobile terminal via a second network, associate the context information with a received inbound call via the second network, present, via a user interface, the context information, to a user of the mobile terminal, receive, via the user interface, instructions regarding handling of the inbound call, and send, to an application server that is different than the notification device, the instructions.

17. The mobile terminal of claim 16, wherein the alert message includes a Short Message System (SMS) message with a BREW (Binary Run Time Environment for Wireless) application message that provides the context information.

18. The user device of claim 16, wherein the user device includes one of:

a tablet computer,
a wireless device,
a cellular telephone,
a smartphone,
a laptop computer,
a music playing device, or
a portable gaming device.

19. A method, comprising:

receiving, by a mobile terminal and from a notification device, an alert message that includes a registration identification for a context notification application running on the mobile terminal and context information for an impending inbound call being forwarded from a first location to the mobile terminal;

associating the context information with a received inbound call, and presenting, via a user interface and to a user of the mobile terminal, the context information, wherein the context information is presented prior to a user's answering the inbound call, receiving, via the user interface, instructions regarding handling of the received inbound call, and sending, to an application server that is different than the notification device, the instructions.

20. The method of claim 19, wherein the context information includes one or more of:

a number dialed by a calling device,
a service used to forward the call,
caller presence information, or
an image associated with the calling device; and wherein the alert message is a Short Message System (SMS) message with a BREW (Binary Run Time Environment for Wireless) application message.

* * * * *